Dec. 2, 1958     J. M. MIZANTY     2,862,627
TIERED SUPPORT FOR FOOD AND OTHER ARTICLES
Filed Nov. 23, 1956     2 Sheets-Sheet 1

INVENTOR.
JOHN M. MIZANTY
BY
ATTORNEYS

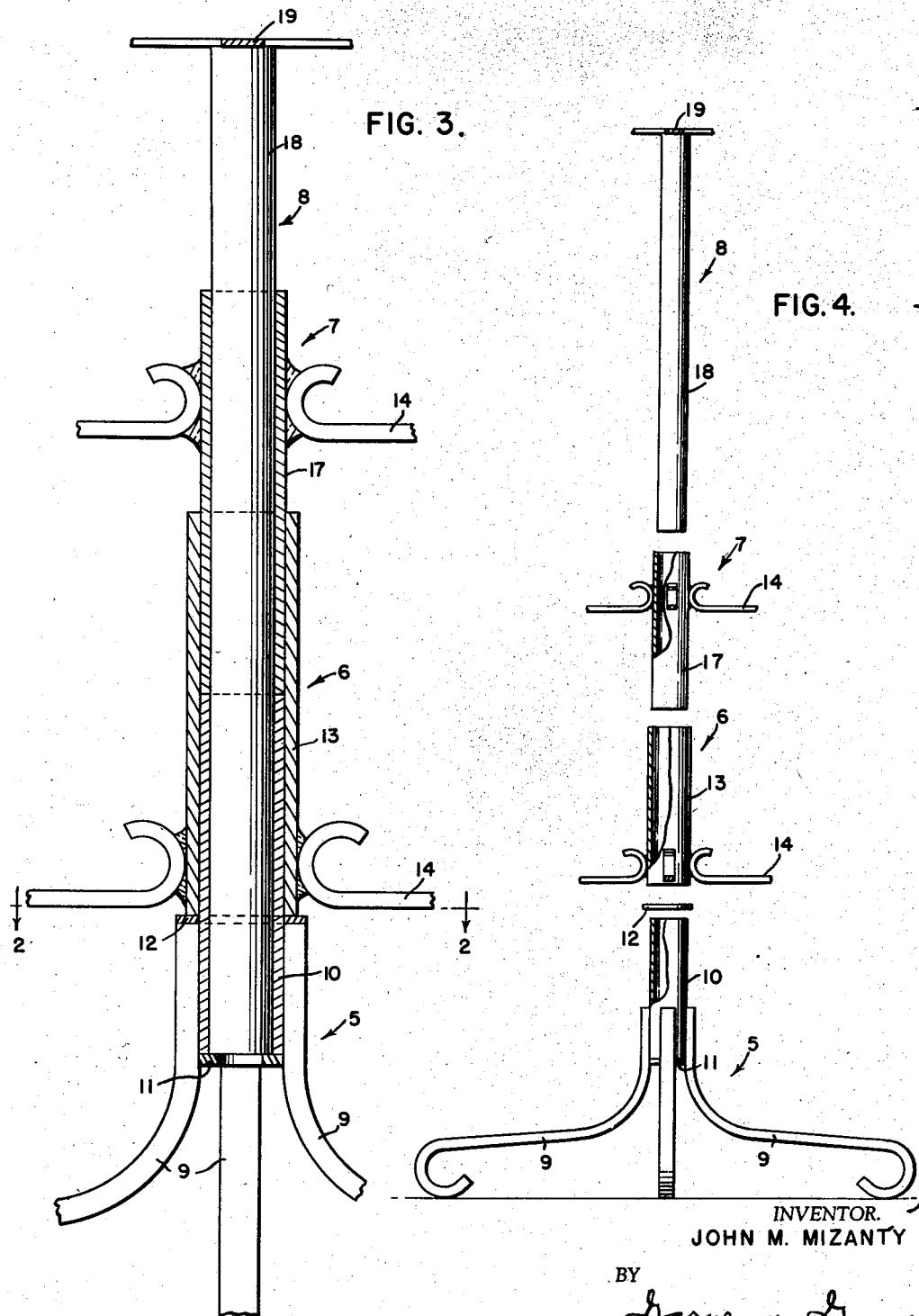

United States Patent Office 2,862,627
Patented Dec. 2, 1958

2,862,627

TIERED SUPPORT FOR FOOD AND OTHER ARTICLES

John M. Mizanty, Carbondale, Pa.

Application November 23, 1956, Serial No. 623,939

3 Claims. (Cl. 211—163)

This invention is a tiered support for food and other articles and is adapted for use on tables to facilitate serving food at meals.

It has been known in the art, at least as early as 1869, to provide rotatable food supports as exemplified in the following patents:

98,269, Kellogg, Dec. 28, 1869
141,390, Sheldon, July 29, 1873
494,704, Hansen, Apr. 4, 1893
795,837, Hyde et al., Aug. 1, 1905

However, none of these devices have proved practical and so far as is known, there is not now available to the purchasing public a multi-tiered food support, the tiers of which are independently rotatable, much less a support constructed in accordance with the present invention, wherein the tiers are nested and held in predetermined spaced relation without the use of screws or extraneous securing means and with a complete absence of ball bearings or other anti-friction agents.

It is also within the contemplation of this invention to provide a self stabilizing tiered support which permits optional use of one or more of the tiers.

It is within the contemplation of the objects of this invention to provide a multi-tiered support, the tiers of which are rotatable and may be used singly or in multiple, and when used in multiple, are positively held in predetermined spaced relation due to the inherent construction of the tiered parts without the aid of securing means.

Other objects of the invention will be manifest from the following description of the present preferred form of the invention, taken in connection with the accompanying drawings, wherein:

Fig. 3 is a fragmentary vertical sectional view of the tiered support, illustrating to advantage the manner in which the parts of the support are inter-fitted when in use; and Fig. 4 is a fragmentary side elevational view of the support with the tiered parts exploded to disclose details.

Figure 1:
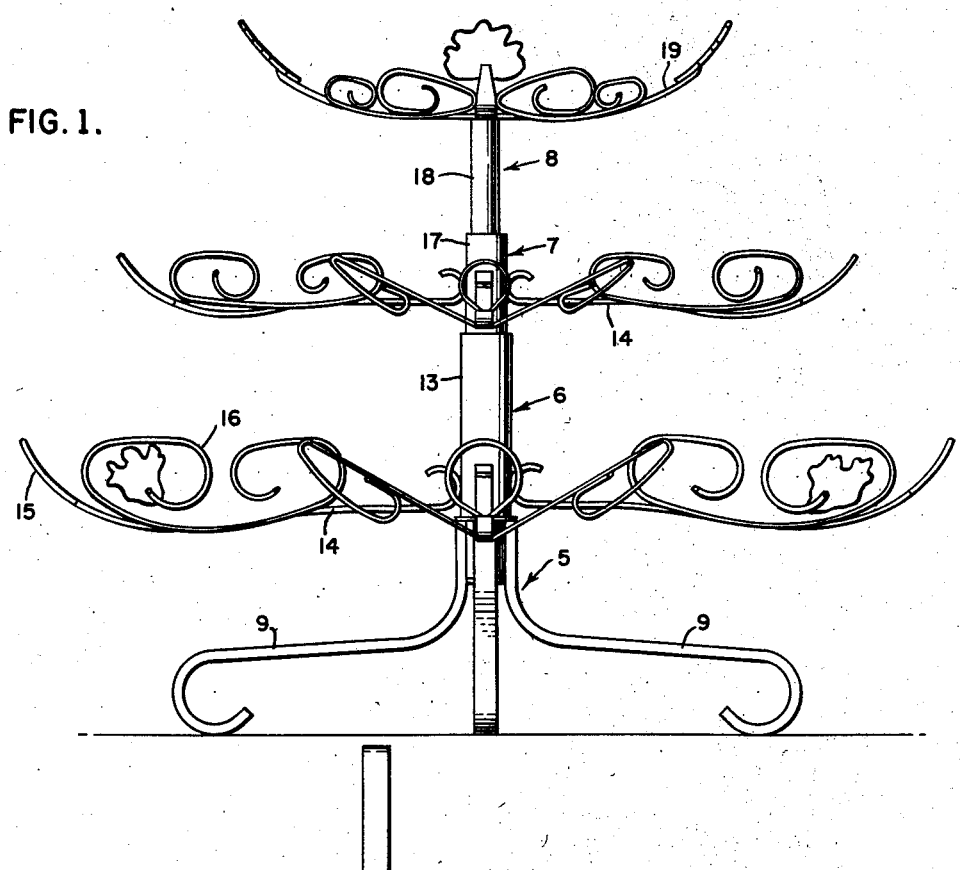
Fig. 1 is a side elevational view of a tiered support constructed in accordance with the present invention.

After much experiment, I have found that it is practical to construct a multi-tiered support especially adapted to support food for service at a meal. While there is no doubt that the support may be made of materials of various miscellany, I have obtained good results from the use of a support made completely of wrought iron, the tiers being constructed and engaged in a manner to be self-supporting and self-connecting without liability of casual displacement in either a vertical or lateral plane, the tiers being freely rotatable and being engageable and dis-engageable at the option of the user.

The invention includes a support 5, upon which is superposed a plurality of tiered supports generally indicated 6, 7 and 8. The base 5 consists of a plurality of legs 9 advantageously illustrated in Figs. 1 and 2. I have found that legs constructed substantially as herein shown, provide adequate support and are spaced in a manner to insure effective stabilization of the support. The inner ends of the legs are secured to a tubular socket 10, the lower end of which is at least partly closed by an annulus 11 which may consist of a washer welded to the bottom of the socket as shown to advantage in Fig. 3. A ring or washer 12 is loosely mounted on the socket 10 and engages the upper terminals of the legs 9 as also shown to advantage in Fig. 3. The lowermost tier includes a tubular sleeve 13 which is slidably engaged over the upper end of the socket 10 and rests in engagement with the washer 12. This tier also includes a plurality of supporting arms 14, the inner ends of which are welded or otherwise fixedly secured to the outer periphery of the sleeve 13, there being preferably four arms. The outer end of each arm is bent upwardly and may be looped or otherwise formed as indicated at 15, to increase the supporting area. Each arm 14 has laterally extending from each side thereof, a reticulated support 16 which may be made of solid rods which are bent upwardly. As shown to advantage in Fig. 1, by bending the arms and their reticulated supporting parts upwardly, a dished-out effect is obtained, to provide a substantial supporting cavity for dishes or other food containing receptacles or for supporting certain foods which are not in receptacles such as fruits.

The intermediate supporting tier 7 is similar in construction to the base tier and includes a tubular sleeve 17 which is smaller in diameter than the sleeve 13 and is adapted to rest in the latter, superimposed on the top of the base socket 10. The intermediate tier is provided with supporting arms 14 which also carry reticulated supports which may be of the same construction as the supports of the base tier 6.

Figure 2:
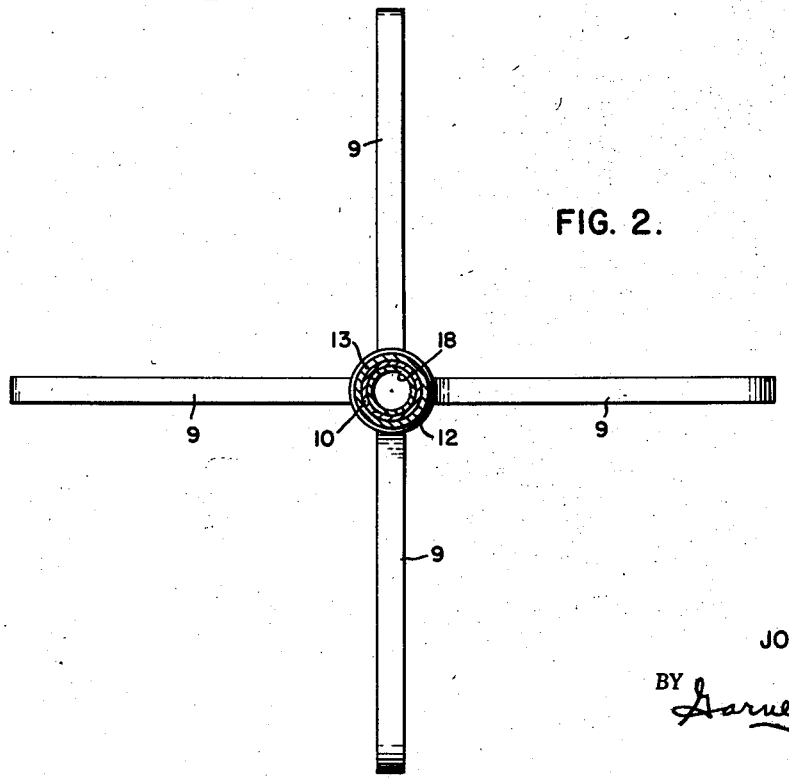
Fig. 2 is a horizontal sectional view taken on the lines 2—2 of Fig. 3, looking in the direction of the arrows.

The uppermost tier 8 consists of a shaft 18 which is preferably tubular and of a length which will enable it to pass downwardly through the sleeve 17, sleeve 13 and into the socket 10, its lower end being adapted to rest on the closed end of the socket 10. The upper end of the shaft 18 is provided with a support 19 which of course is also adapted for the reception of food either in receptacles or per se, the support, as shown in Fig. 1, being bent upwardly to provide a dish-like effect to prevent lateral displacement of articles placed therein.

In use of this device, I have found that the uppermost tier 8 may be mounted in the socket 10 and used by itself for various purposes. Also, if desired, the base tier 6 may be mounted on the socket 10 and used by itself. The base tier 6 and intermediate tier 7 may be used together, with the base, without the top tier, and also the base tier and top tier may be used with the base, without an intermediate tier. It is of course to be understood that intermediate tiers may be added, as desired.

From the above, it is apparent that the parts of this support may be quickly and easily assembled, without the use of tools and without the use of fastening means of any kind. The positioning of the various tiers is predetermined and there is no variation in the distance between the tiers, even when loaded with food, because of the inherent construction of the support and the manner in which the parts are inter-engaged. Disengagement of the parts of the support is likewise a simple matter which is done manually, without the aid of any tools.

While I have herein described a preferred embodiment of my invention, it is nevertheless to be understood that various changes may be made therein, without departing from the spirit and scope of the claims hereto appended.

What I claim is:

1. A tiered support for food and other articles including a supporting base embodying a tubular socket the bottom of which is at least partly closed, a supporting tier having a tubular sleeve slidably engaged over said socket, a second supporting tier having a tubular member slidable through the tubular sleeve of said first tier and abutting said base socket, and a top tier including a shaft which extends through said first and second tiers and into engagement with the closed inner end of the base socket.

2. A tiered support for food and other articles including a supporting base embodying a tubular socket and legs affixed to the outer wall of said socket; a supporting tier having a tubular sleeve slidably engaged over the upper end of said tubular socket and engageable with the legs at their point of connection to the socket wall to limit the extent of movement of said tubular sleeve over the socket; and a second supporting tier superimposed on the first supporting tier and comprising a tubular member slidable through said tubular sleeve and engageable with the upper terminal of the tubular socket.

3. A tiered support for food and other articles including a supporting base embodying a tubular socket, the bottom of which is at least partly closed, and supporting legs affixed to the outer wall of the socket, a supporting tier having a tubular sleeve slidably engaged over the upper end of said socket, the extent of movement of said tubular sleeve over the socket being limited by abutment against the legs of the supporting base, a second supporting tier having a tubular member slidable through the tubular sleeve of said first tier and abutting the upper terminal of the tubular socket of the supporting base, and a top tier including a shaft which extends through the tubular sleeve and tubular member of said first and second tiers into engagement with the closed lower end of the base socket.

References Cited in the file of this patent

UNITED STATES PATENTS

| D. 160,688 | Brock | Oct. 31, 1950 |
| 121,208 | Smith et al. | Nov. 21, 1871 |
| 135,696 | Dakin | Feb. 11, 1873 |

FOREIGN PATENTS

| 1,072,298 | France | Mar. 10, 1954 |